United States Patent [19]

Sherman

[11] 4,349,981
[45] Sep. 21, 1982

[54] CONTACT POISON DELIVERY DEVICE

[76] Inventor: Daniel S. Sherman, 76 Ninth Ave., New York, N.Y. 10011

[21] Appl. No.: 179,775

[22] Filed: Aug. 20, 1980

[51] Int. Cl.³ ............................................. A01M 25/00
[52] U.S. Cl. ........................................ 43/131; 43/114
[58] Field of Search .................................. 43/131, 114

[56] References Cited

U.S. PATENT DOCUMENTS

| 4,132,026 | 1/1979 | Dodds | 43/131 |
| 4,161,079 | 7/1979 | Hill | 43/131 |
| 4,281,471 | 8/1981 | Jenkins et al. | 43/131 |

FOREIGN PATENT DOCUMENTS 2111022  9/1972  Fed. Rep. of Germany ........ 43/131

Primary Examiner—Donald R. Schran
Attorney, Agent, or Firm—Henderson & Sturm

[57] ABSTRACT

This invention relates to vermine control devices in general, and more specifically to a low profile rodent contact poison delivery device which is intended to be placed along a runway or path normally traversed by the rodents, and which is designed in such a manner that the rodents will traverse the device, thereby picking up a contact poison on their feet, skin and fur which will cause their eventual demise.

4 Claims, 3 Drawing Figures

CONTACT POISON DELIVERY DEVICE

BACKGROUND OF THE INVENTION

Historically rodents have plagued mankind by infesting his homes and cities, spreading filth and disease not to mention the fouling and consumption of edible material. As a consequence of these undesirable traits and characteristics many techniques have been developed to destroy or at least reduce to acceptable levels the ever burgeoning rodent populations.

Some of the more familiar devices employed to this end are the baited mechanical traps and poisoned bait stations, examples of which can be found in U.S. Pat. Nos. 3,094,805; 4,132,026; 3,298,128 and 2,912,788.

One of the more effective methods, which is not as widely known by the general populace, is the use of tracking powders or contact poisons such as toxic chemical compounds, which adhere to the fur, feet and skin of rodents exposed to them. These poisons are absorbed through the rodent's skin or are ingested during feeding or preening thereby causing their ultimate demise.

Unfortunately, while proving to be highly effective in controlling rodent populations, these tracking and contact poisons have also proven to be messy and potentially hazardous to humans and household pets.

Existing tracking or contact poison delivery devices are defective in several respects. They are bulky and physically obtrusive, so that they interfere with pedestrian and other traffic and therefore subject to being trampled or crushed by feet or rolling stock. Others are of a size and shape which make them unsuitable for placement in the out-of-the-way places which rodents normally traverse. Still others are not aesthetically appealing, and as such are inappropriate for use in areas where the device will be readily visible. In summary there has not been developed to date a tracking or contact poison delivery device which is practical, aesthetically pleasing and which will effectively contain and safely deliver the toxic material without subjecting humans or pets to undue risk.

SUMMARY OF THE INVENTION

An object of the present invention in the provision of an inexpensive, easily manufactured, yet effective means to deliver any of the contact poisons or tracking powders currently used for rodent controls.

Another object is to provide a durable delivery device which is easily refilled with poison and which is reusable many times thereby increasing its useful life.

Yet another object is to provide a device which is aesthetically appealing and yet conforms to the habits and activities of the rodent populations, providing an inviting environment for mice to hide in and travel through.

A still further object is the provision of a low profile, unobtrusive delivery means, which will "hug" corners and will not interfere with feet, brooms or rolling devices.

Still another object of the instant invention is to safely contain the poison, preventing its spillage and preventing excess poison from being carried out of the device by rodents on their fur.

A further object of the instant invention is the provision of a device, which will induce the rodent into frenzied activity within its confines, thereby enhancing the coating of the contact poison on the rodent's body and inducing respiratory ingestion of air borne particles of the toxic substance to hasten its demise.

These and other objects, advantages and novel features of the present invention will become apparent from the following detailed description of the invention when considered in conjunction with accompanying drawings.

DETAILED DESCRIPTION OF THE PREFERRED EMBODIMENT

Figure 1:
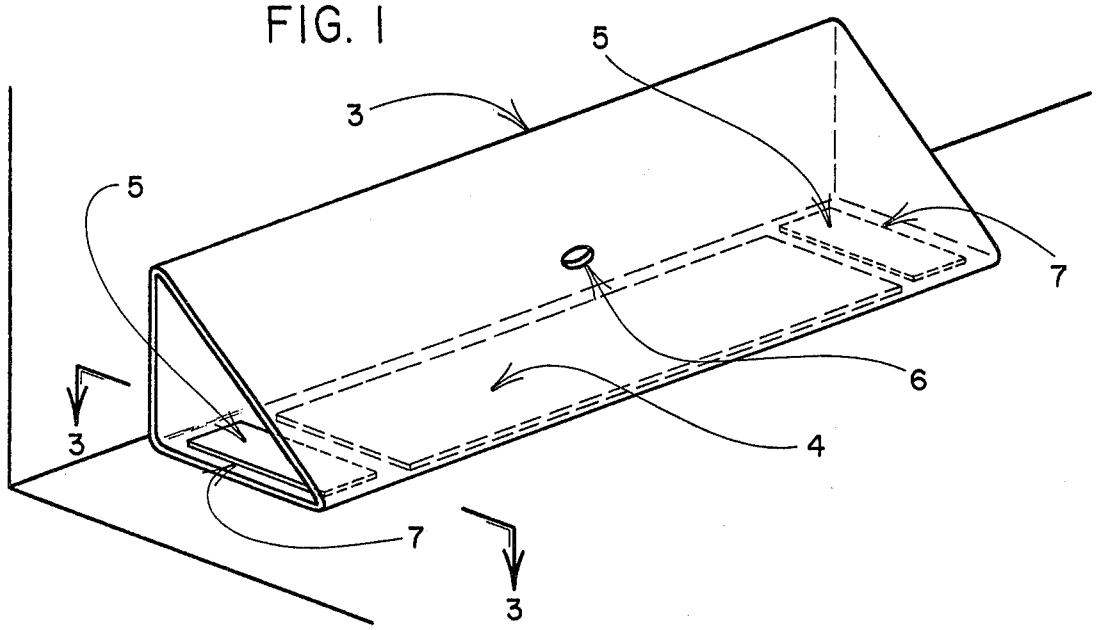
FIG. 1 is a perspective view of the Pest Control Device as it would be employed in a home or commercial establishment.

In FIG. 1 the contact poison delivery device is designated generally as 3 and comprises a hollow elongated tubular member having a generally triangular cross sectional configuration. Inasmuch as the device 3 is designed to have a long useful life, it will preferrably be manufactured from a hard, rigid plastic or other suitable material.

Figure 2:
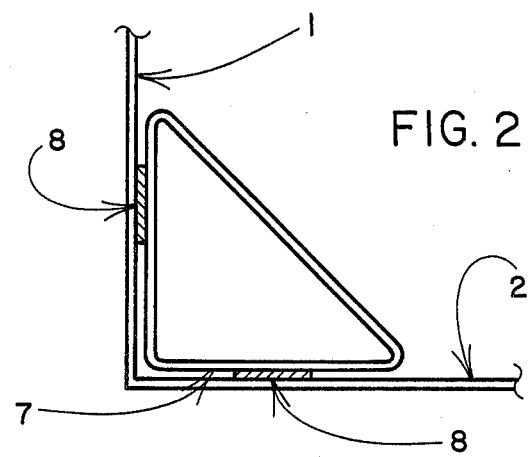
FIG. 2 is a side view of the device disposed against a wall.
Figure 3:
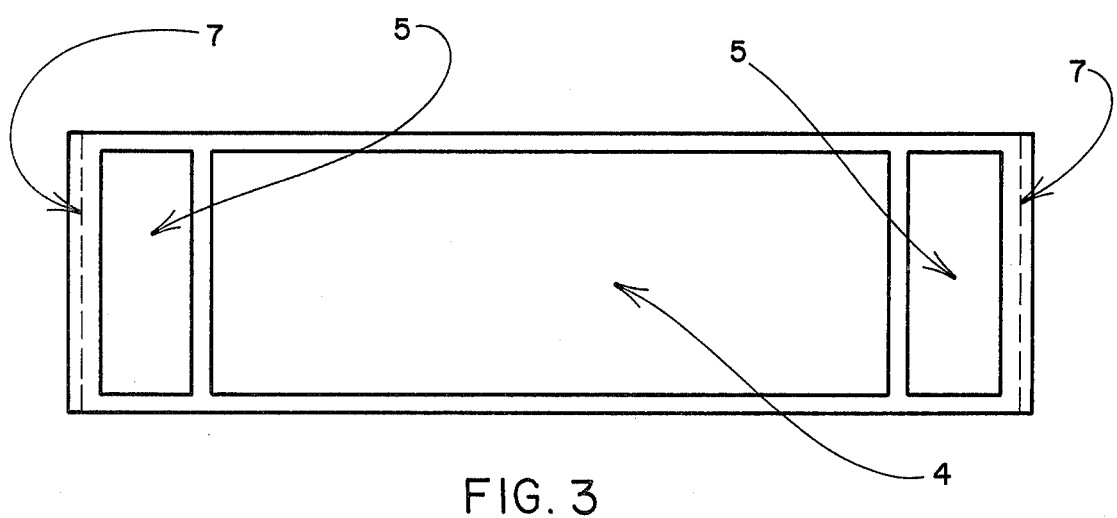
FIG. 3 is a cross-sectional view of the device taken through line 3—3 of FIG. 1.

Referring now to FIG. 2 it can be seen that the walls that form the generally triangular configuration are very thin with respect to both their length and depth. The depth, configuration and thickness of the walls serve the following purposes and functions; they present a narrow profile to rodents entering the hollow interior of the device; they allow the rodents very little room to manuever as they traverse the device and virtually insures contact of the rodent's body with all three walls; and it further gives the appearance of a dark safe hiding place which the rodents seem to prefer, thereby inducing them to linger within the confines of the device and consequently come into contact with more of the poison contained therein.

The three walls which comprise the elongated tubular member consist of a horizontal wall and a vertical wall joined by an angled face wall. Both the horizontal and vertical walls are provided with securing means 8 in the form of strips of double stick adhesive tape so that the device 8 can be attached to a floor and wall along a runway or track which the rodents are using. These securing means will insure that the device will remain in place as long as desired, and prevent it from being accidentally dislodged by outside forces.

The angled face wall is further provided with a centrally disposed aperture 6 which serves as a filling port for the toxic material or contact poison. The device is dimensioned such that the poison will be centrally deposited within the hollow interior, but the substance will be spaced from either end.

As rodents traverse the device in either direction during their nocturnal forays, there will be a tendency for the poison to be tracked to and beyond the confines of the device. To prevent this from happening poison retention elements 5 are disposed on the horizontal wall at either end of the device 3. The poison retention elements 5 are in the form of felt pads which will wipe the poison from the rodent's feet as they exit the device, and substantially minimize the amount of poison which is tracked outside the device, thereby reducing the health hazard to humans and pets. In addition to the elements 5, the device 3 may be further provided with raised lips 7 on the ends of the horizontal wall to further contain the poison.

In an alternate embodiment the device 3 is further provided with an adhesive entrapment element 4 disposed along the horizontal wall. This entrapment element 4 may be of the fly paper type, wherein the rodent cannot free itself after contact with the adhesive surface, or it may just be a tacky surface which would cause frenzied activity by the rodent within the confines of the device to insure that the maximum amount of poison was transferred to its body.

One very important aspect of the instant invention which has not been mentioned hereintofore is the function of the angled face wall and the unexpected result which derives from the choice of hard plastic as the preferred material for fabrication of the device.

The angled face wall not only deflects blows from feet, brooms, vacuums and other rolling stock in a commercial or residential environment, but further forms a restricted passageway which forces the rodent to crouch upon entering the device. As the rodent traverses the device its fur will of necessity contact the interior walls. The fur rubbing against the plastic walls creates static electricity which attracts the particulate poisons to the surface of interior walls for subsequent direct and sequential transfer to the bodies of rodents traversing the device. Obviously the device can be fabricated from among a class of materials which exhibit the same physical characteristics.

Having thereby described the subject matter of the invention, it should be appreciated that many substitutions, variations and modifications are possible in light of the above teachings. It is therefore to be understood that the invention is to be limited only by the breadth and scope of the appended claims.

What I claim is:

1. A contact poison delivery device for depositing a particulate poison on the feet and fur of a rodent traversing at least a portion of its length, wherein the device comprises a thin walled elongated open-ended triangular tubular member, dimensioned to form a restricted passageway for rodents entering the device, and having a vertical wall member, a horizontal wall member, and an angled wall member; wherein, the said angled wall member is provided with a centrally disposed aperture, which permits the introduction of particulate poison into the interior of the device, intermediate the ends, the said horizontal wall member is provided with poison retention means adjacent its ends, at least one of the said wall members being provided with means for inducing the frenzied activity of a rodent upon contact therewith, disposed intermediate the ends of said at least one wall member, and wherein the vertical wall member, the horizontal wall member, and the angled wall member are fabricated from a material which will create a static electric charge, by the contact of the rodents fur with the interior walls of the device, whereby there will be both, a direct static electric attraction, and a rubbing transfer, of the particulate poison onto the rodents fur.

2. A contact poison delivery device as in claim 1; wherein, the poison retention means comprise a raised lip formed integrally with the ends of the horizontal wall member.

3. A contact poison delivery device as in claim 2; wherein, the poison retention means further comprise felt pads disposed adjacent the ends of the horizontal wall member.

4. A contact poison delivery device as in claim 1; wherein, the means for inducing frenzied activity by the rodent upon contact therewith, comprises an adhesive strip disposed intermediate the ends of the horizontal wall member.

* * * * *